United States Patent
Nishiura

(10) Patent No.: US 10,618,320 B2
(45) Date of Patent: Apr. 14, 2020

(54) IRRADIATION DEVICE, SHAPE FORMING SYSTEM, IRRADIATION METHOD, AND COMPUTER-READABLE STORAGE MEDIUM

(71) Applicant: CASIO COMPUTER CO., LTD., Tokyo (JP)

(72) Inventor: Fusao Nishiura, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/265,888

(22) Filed: Feb. 1, 2019

(65) Prior Publication Data
US 2019/0263144 A1    Aug. 29, 2019

(30) Foreign Application Priority Data
Feb. 23, 2018 (JP) ................. 2018-031069

(51) Int. Cl.
*B41J 11/00* (2006.01)
*B41M 7/00* (2006.01)
*B29C 64/264* (2017.01)

(52) U.S. Cl.
CPC .......... *B41J 11/002* (2013.01); *B29C 64/264* (2017.08); *B41M 7/0081* (2013.01)

(58) Field of Classification Search
CPC .... B41J 11/002; B41M 7/0081; B29C 64/264
See application file for complete search history.

(56) References Cited

U.S. PATENT DOCUMENTS

2017/0368721 A1* 12/2017 Saito ................ B29C 59/18

FOREIGN PATENT DOCUMENTS

| JP | S64-28660 A | 1/1989 |
|---|---|---|
| JP | 2001-150812 A | 6/2001 |
| JP | 2008-209905 A | 9/2008 |
| JP | 2013-129144 A | 7/2013 |
| JP | 2016-10956 A | 1/2016 |
| JP | 2017-226114 A | 12/2017 |

* cited by examiner

*Primary Examiner* — Thinh H Nguyen
(74) *Attorney, Agent, or Firm* — Chen Yoshimura LLP

(57) ABSTRACT

An irradiation device for causing distension of a thermally distensible sheet that distends due to heat, comprising: a temperature sensor; a humidity sensor; an irradiation unit that irradiates the thermally distensible sheet with electromagnetic waves; and a controller configured to: estimate an amount of moisture contained in the thermally distensible sheet on the basis of values of measurements from the temperature sensor and the humidity sensor, set a relative speed between the irradiation unit and the thermally distensible sheet in accordance with the estimated amount of moisture in the thermally distensible sheet, and cause the irradiation unit or the thermally distensible sheet to move relative to each other at the relative speed that has been set while irradiating the thermally distensible sheet with the electromagnetic waves.

17 Claims, 10 Drawing Sheets

IRRADIATION DEVICE, SHAPE FORMING SYSTEM, IRRADIATION METHOD, AND COMPUTER-READABLE STORAGE MEDIUM

BACKGROUND OF THE INVENTION

Field of the Invention

The present invention relates to an irradiation device, a shape forming system, an irradiation method, and a computer-readable storage medium.

Description of the Related Art

Techniques for making shaped objects (also called three-dimensional objects or the like) are known. For example, Japanese Patent Application Laid-Open Publication No. S64-28660 and Japanese Patent Application Laid-Open Publication No. 2001-150812 disclose methods for forming, as shaped objects, three-dimensional images that span three dimensions. Specifically, in the methods disclosed in Japanese Patent Application Laid-Open Publication No. S64-28660 and Japanese Patent Application Laid-Open Publication No. 2001-150812, a pattern is formed on a rear surface of a thermally distensible sheet using a material that has excellent light absorption characteristics, and as the thermally distensible sheet is conveyed by a conveyor, the pattern that was formed is irradiated with light (electromagnetic waves), thereby heating the pattern. This causes portions of the thermally distensible sheet where the pattern was formed to distend and rise up, and a three-dimensional image is formed.

If the amount of moisture contained in a thermally distensible sheet such as that described above changes according to the surrounding environment, the degree of distension of the thermally distensible sheet will also change. Accordingly, in order to cause precise distension of a thermally distensible sheet so as to obtain a desired shaped object, it is necessary to properly control the degree of distension in accordance with the moisture contained in the thermally distensible sheet.

The present invention has been devised in order to solve the above-mentioned problem, and an object hereof is to provide an irradiation device, shape forming system, irradiation method, and computer-readable storage medium with which the degree of distension of a thermally distensible sheet is able to be properly controlled.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides: an irradiation device for causing distension of a thermally distensible sheet that distends due to heat, including: a temperature sensor; a humidity sensor; an irradiation unit that irradiates the thermally distensible sheet with electromagnetic waves; and a controller configured to: estimate an amount of moisture contained in the thermally distensible sheet on the basis of values of measurements from the temperature sensor and the humidity sensor, set a relative speed between the irradiation unit and the thermally distensible sheet in accordance with the estimated amount of moisture in the thermally distensible sheet, and cause the irradiation unit or the thermally distensible sheet to move relative to each other at the relative speed that has been set while irradiating the thermally distensible sheet with the electromagnetic waves.

In another aspect, the present disclosure provides an irradiation device for causing distension of a thermally distensible sheet that distends due to heat, including: a temperature sensor; a humidity sensor; an irradiation unit that irradiates the thermally distensible sheet with electromagnetic waves; and a controller configured to: calculate, on the basis of values of measurements from the temperature sensor and the humidity sensor, a water vapor density in an ambient air that influences the thermally distensible sheet when the thermally distensible sheet distends upon being irradiated with the electromagnetic waves by the irradiation unit, set a relative speed between the irradiation unit and the thermally distensible sheet in accordance with the calculated water vapor density in the ambient air, and cause the irradiation unit or the thermally distensible sheet to move relative to each other at the relative speed that has been set while irradiating the thermally distensible sheet with the electromagnetic waves.

In another aspect, the present disclosure provides an irradiation method for causing distension of a thermally distensible sheet that distends due to heat, including: estimating an amount of moisture contained in the thermally distensible sheet on the basis of a measured temperature and a measured humidity of an ambient air; setting a relative speed between an irradiation unit and the thermally distensible sheet in accordance with the amount of moisture estimated in the estimation step; and causing the thermally distensible sheet and the irradiation unit to move relative to one another at the relative speed set in the setting step while causing the irradiation unit to radiate electromagnetic waves toward the thermally distensible sheet.

In another aspect, the present disclosure provides a non-transitory computer-readable storage medium having stored thereon a program executable by one or more processors in an irradiation device, the irradiation device further including an irradiation unit that irradiates the thermally distensible sheet with electromagnetic waves, the program causing the one or more processors to perform the following: estimating an amount of moisture contained in the thermally distensible sheet on the basis of a measured temperature and a measured humidity in an ambient air; setting a relative speed between the irradiation unit and the thermally distensible sheet in accordance with the amount of moisture estimated in the estimation step; and causing the thermally distensible sheet and the irradiation unit to move relative to one another at the relative speed set in the setting step while causing the irradiation unit to radiate the electromagnetic waves toward the thermally distensible sheet.

It is to be understood that both the foregoing general description and the following detailed description are exemplary and explanatory, and are intended to provide further explanation of the invention as claimed.

DETAILED DESCRIPTION OF EMBODIMENTS

Figure 1:
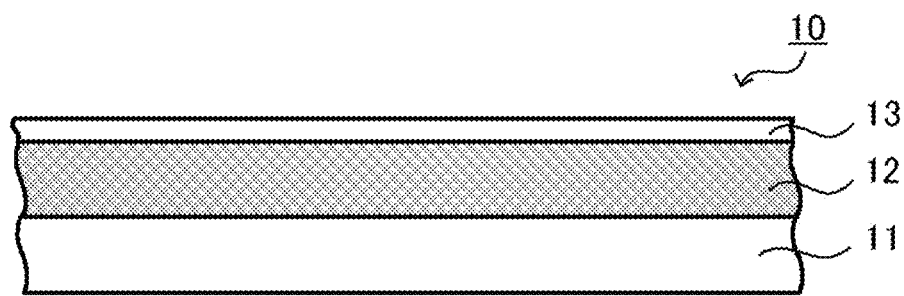
FIG. 1 is a cross-sectional view of a thermally distensible sheet according to an embodiment of the present invention.

Embodiments of the present invention will be described below with reference to the drawings. Note that identical reference characters are given to identical or corresponding parts in the drawings.

<Thermally Distensible Sheet 10>

FIG. 1 illustrates the cross-sectional configuration of a thermally distensible sheet 10 for making a shaped object. The thermally distensible sheet 10 is a medium with which a shaped object is made as a result of a pre-selected portion of the thermally distensible sheet 10 distending due to the application of heat thereto. Shaped objects are objects that have a three-dimensional shape, and are made as a result of part of a two-dimensional sheet distending in a direction perpendicular to the sheet. Shaped objects are also called three-dimensional objects or three-dimensional images. Shapes for shaped objects can include shapes such as simple shapes, geometric shapes, and characters.

As illustrated in FIG. 1, the thermally distensible sheet 10 is provided with a base member 11, a thermally distensible layer 12, and an ink-accepting layer 13 in this sequence. Note that FIG. 1 illustrates a cross-section of the thermally distensible sheet 10 in a state prior to a shaped object being made, that is, in a state in which there is no distension of any part of the thermally distensible sheet 10.

The base member 11 is a sheet-shaped medium that serves as a foundation for the thermally distensible sheet 10. The base member 11 is a support element that supports the thermally distensible layer 12 and the ink-accepting layer 13, and acts to maintain the strength of the thermally distensible sheet 10. Ordinary printing paper, for example, can be used as the base member 11. Alternatively, the material for the base member 11 may be a synthetic paper, a cloth made of canvas or the like, or a plastic film made of polypropylene, polyethylene terephthalate (PET), polybutylene terephthalate (PBT), or the like, but there is no particular limitation thereto.

The thermally distensible layer 12 is layered on the upper side of the base member 11, and is a layer that distends as a result of being heated to a specified temperature or higher. The thermally distensible layer 12 includes a binder and a thermal distension agent that is dispersed within the binder. The binder is a vinyl-acetate-based polymer, an acrylic-based polymer, or other thermoplastic resin. Specifically, the thermal distension agent is made of thermally distensible microcapsules (micropowder) that have a particle diameter of approximately 5-50 μm and contain a substance that vaporizes at a low boiling point, such as propane or butane, inside a thermoplastic resin shell. When the thermal distension agent is heated to a temperature from about 80° C. to 120° C., for example, the substance contained therein is vaporized, and pressure therefrom causes foaming and distension. The thermally distensible layer 12 thus distends in accordance with the amount of heat that has been absorbed. The thermal distension agent is also referred to as a foaming agent.

The ink-accepting layer 13 is an ink-absorbing-and-accepting layer that is layered on the upper side of the thermally distensible layer 12. The ink-accepting layer 13 accepts printer ink used by inkjet printers, printer toner used by laser printers, ink for ballpoint or fountain pens, pencil lead, and the like. The ink-accepting layer 13 is formed using a suitable material for having these stick to a front surface of the thermally distensible sheet 10. A general-purpose material used for inkjet paper, for example, can be used as the material for the ink-accepting layer 13.

Figure 2A:
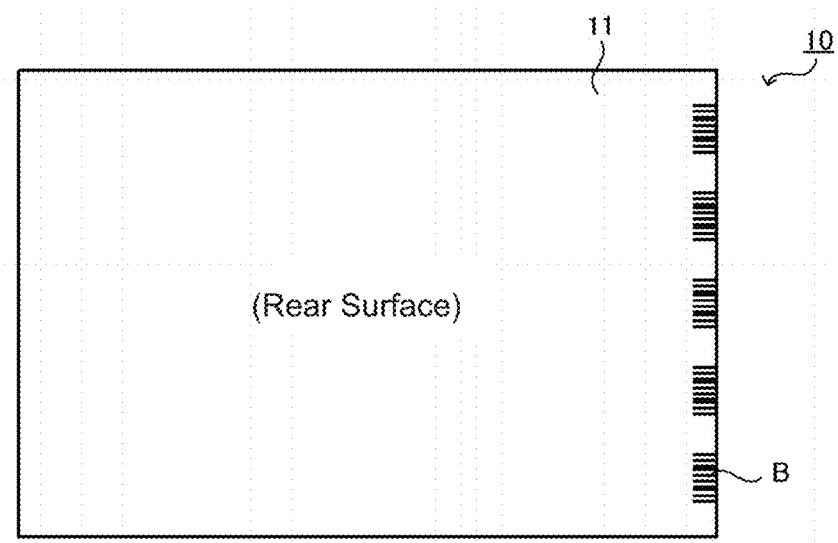
FIG. 2A is a diagram illustrating a rear surface of a thermally distensible sheet of a first size according to an embodiment of the present invention.
Figure 2B:
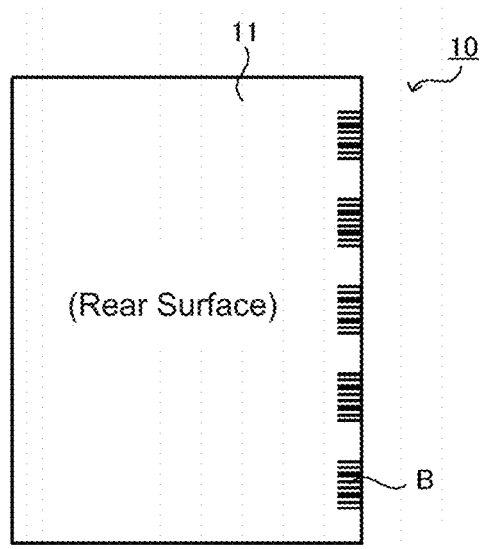
FIG. 2B is a diagram illustrating a rear surface of a thermally distensible sheet of a second size according to an embodiment of the present invention.

FIGS. 2A and 2B illustrate rear surfaces of thermally distensible sheets 10. The rear surface of each thermally distensible sheet 10 is the surface on the base member 11 side of the thermally distensible sheet 10, and corresponds to the rear surface of the base member 11. FIG. 2A illustrates the rear surface of a thermally distensible sheet 10 for which the sheet size is a first size, and FIG. 2B illustrates the rear surface of a thermally distensible sheet 10 for which the sheet size is a second size. The first size is, for example, A3 size, and the second size is, for example, A4 size. That is, the size of the thermally distensible sheet 10 illustrated in FIG. 2B is half the size of the thermally distensible sheet 10 illustrated in FIG. 2A.

As illustrated in FIGS. 2A and 2B, a plurality of barcodes B are placed along the periphery of the rear surfaces of thermally distensible sheets 10. More specifically, barcodes B are provided along one widthwise edge of the thermally distensible sheet 10 of the first size illustrated in FIG. 2A, and barcodes B are provided along one lengthwise edge of the thermally distensible sheet 10 of the second size illustrated in FIG. 2B. The barcodes B are identifiers for identifying a thermally distensible sheet 10, and are identifiers indicating that the thermally distensible sheet 10 is a specialized sheet for making a shaped object. The barcodes B are read by an irradiation device 50, and are used to determine whether a thermally distensible sheet 10 can be used in the irradiation device 50. The barcodes B also contain size information indicating whether the size of the thermally distensible sheet 10 is the first size or the second size, and information indicating the thickness of the thermally distensible sheet 10, the type of the base member 11, etc.

With a shape forming system 1, it is possible to manufacture a shaped object on multiple types of such thermally distensible sheets 10 having differing sizes. Carbon molecules are printed on portions of the front surface or the rear surface of a thermally distensible sheet 10 where distension is desired. Carbon molecules are contained in black (carbon black) and other colors of ink, and are one kind of electromagnetic wave-heat conversion material (heat-generating agent) that absorbs and converts electromagnetic waves into heat. The carbon molecules generate heat due to thermal vibrations caused by the absorption of electromagnetic waves. When a portion of a thermally distensible sheet 10 where carbon molecules are printed is heated, the thermally distensible layer 12 in this portion distends and a bump is formed. By using such bumps in a thermally distensible layer 12 to create protrusions or protruding and recessed shapes, a shaped object is manufactured on a thermally distensible sheet 10.

A variety of shaped objects can be obtained through the combination of heights and locations caused to distend on a thermally distensible sheet 10. Further, the expression of aesthetics or texture visually or tactually by the formation of shapes is referred to as "decorating (ornamenting)".

<Shape Forming System 1>

Next, the shape forming system 1 for manufacturing a shaped object on the thermally distensible sheet 10 will be described with reference to FIGS. 3A to 3C.

Figure 3A:
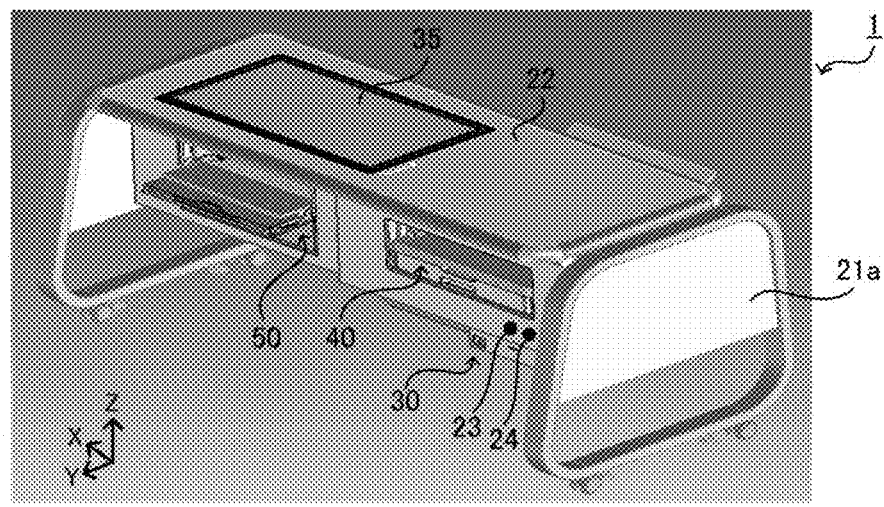
FIGS. 3A to 3C are diagrams schematically illustrating a shape forming system according to an embodiment of the present invention.

FIG. 3A is a perspective view of the shape forming system 1. FIG. 3B is a front view of the shape forming system 1. FIG. 3C is a plan view of the shape forming system 1 in a state in which a top panel 22 is open. In FIGS. 3A to 3C, the X direction corresponds to a direction in which a printer 40 and an irradiation device 50 are arranged side-by-side, the Y direction corresponds to a conveyance direction of thermally distensible sheets 10 through the printer 40 and the irradiation device 50, and the Z direction corresponds to a vertical direction. The X direction, the Y direction, and the Z direction are mutually orthogonal to one another.

Figure 3B:
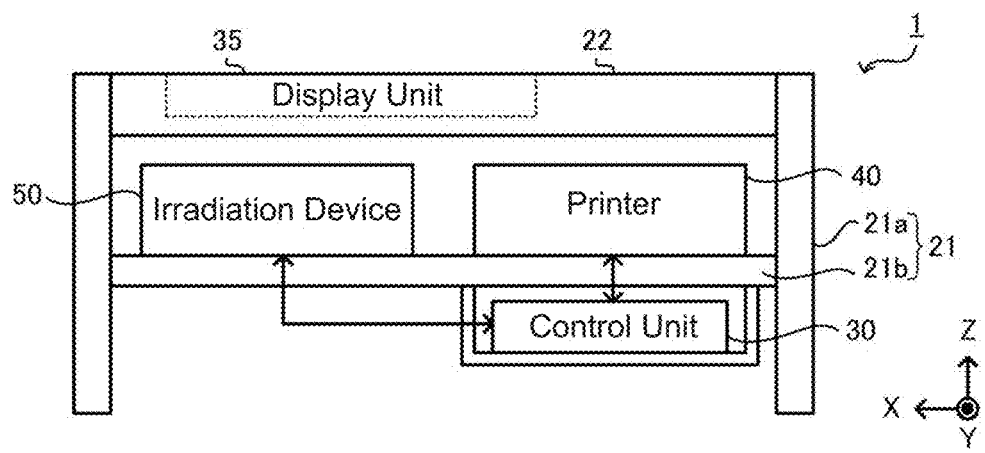
Figure 3C:
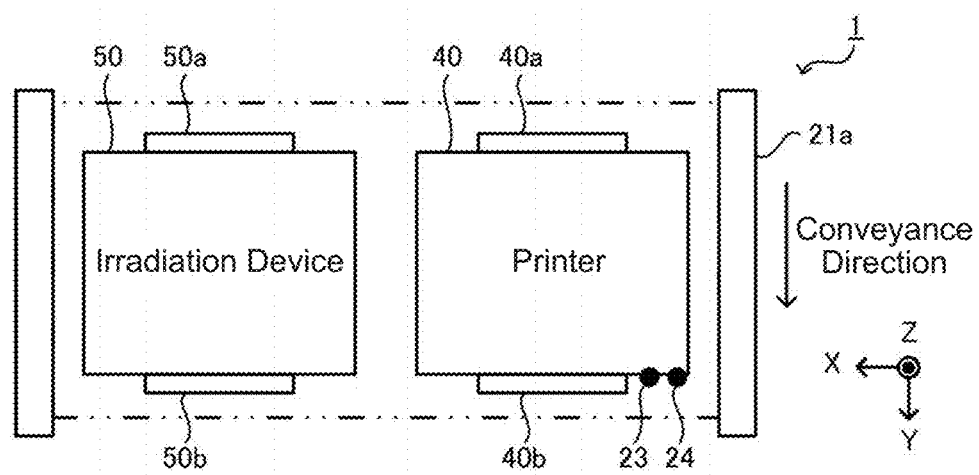

As illustrated in FIGS. 3A to 3C, the shape forming system 1 is provided with a control unit 30, a display unit 35, the printer (printing unit) 40, and the irradiation device (irradiation unit) 50. The control unit 30, the printer 40, and the irradiation device 50 are placed inside a frame 21. The frame 21 is provided with a pair of substantially rectangular side panels 21a, and with a connecting portion 21b provided between the pair of side panels 21a. The top panel 22 spans between upper parts of the side panels 21a. The printer 40 and the irradiation device 50 are installed side-by-side in the X direction on the connecting portion 21b, and the control unit 30 is installed under the connecting portion 21b. The display unit 35 is embedded within the top panel 22 such that the height of the display unit 35 matches the height of the upper surface of the top panel 22.

<Control Unit 30>

Figure 4:
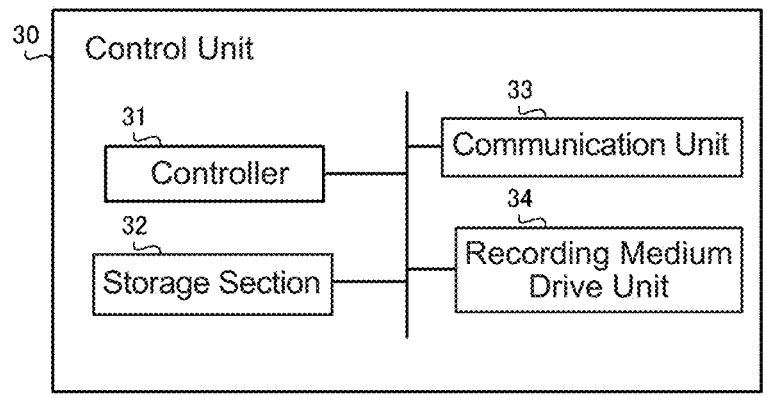
FIG. 4 is a block diagram illustrating configuration for a control unit according to the embodiment of the present invention.

The control unit 30 controls the printer 40, the irradiation device 50, and the display unit 35. The control unit 30 also supplies power to the printer 40, the irradiation device 50, and the display unit 35. As illustrated in FIG. 4, the control unit 30 is provided with a controller 31, a storage section 32, a communication unit 33, and a recording medium drive unit 34. These components are connected through a bus for transmitting signals.

The controller 31 is provided with a central processing unit (CPU), read-only memory (ROM), and random-access memory (RAM). In the controller 31, the CPU reads a control program stored in the ROM, and controls the overall operation of the shape forming system 1 while using the RAM as working memory. Note that the controller 31 may be a dedicated control circuit such as an application-specific integrated circuit (ASIC).

The storage section 32 is, for example, flash memory or a hard disk. The storage section 32 stores data or programs executed by the controller 31. For example, the storage section 32 stores front foaming data, rear foaming data, and color image data to be printed by the printer 40.

The communication unit 33 is an interface for communicating with external devices, which include the printer 40, the irradiation device 50, and the display unit 35.

The recording medium drive unit 34 reads data or programs recorded on a portable recording medium. The portable recording medium is a compact disc read-only memory (CD-ROM), a digital versatile disc read-only memory (DVD-ROM), flash memory provided with a connector using a universal serial bus (USB) standard, or the like. For example, the recording medium drive unit 34 reads and acquires front foaming data, rear foaming data, and color image data to be printed by the printer 40 from the portable recording medium.

<Display Unit 35>

The display unit 35 is provided with a display such as a liquid-crystal display or an organic electro-luminescence (EL) display, and a display drive circuit that causes images to be displayed on the display. The display unit 35 displays images to be printed on a thermally distensible sheet 10 by the printer 40. The display unit 35 also displays information indicating the current status of the printer 40 and the irradiation device 50, as necessary.

Note that although not illustrated in the drawings, the shape forming system 1 may be provided with an operation unit that is operated by a user. The operation unit is provided with a button, switch, dial, and the like, and receives operations for the printer 40 or the irradiation device 50. Alternatively, the display unit 35 may be provided with a touch panel or a touch screen configured by overlaying the display and the operation unit.

<Printer 40>

The printer 40 is a printing unit that prints on the front surface or the rear surface of thermally distensible sheets 10. The printer 40 is, for example, an inkjet printer that prints images by forming ink into fine droplets and directly spraying these fine droplets onto a medium to be printed. Any ink, such as a water-based ink, a solvent ink, or an ultraviolet-curable ink, can be used in the printer 40.

As illustrated in FIG. 3C, the printer 40 is provided with an intake section 40a for taking in thermally distensible sheets 10, and with a discharge section 40b for discharging thermally distensible sheets 10. The printer 40 prints a designated image on the front surface or the rear surface of thermally distensible sheets 10 taken in through the intake section 40a, and the printer 40 discharges thermally distensible sheets 10 on which an image has been printed from the discharge section 40b.

Figure 5:
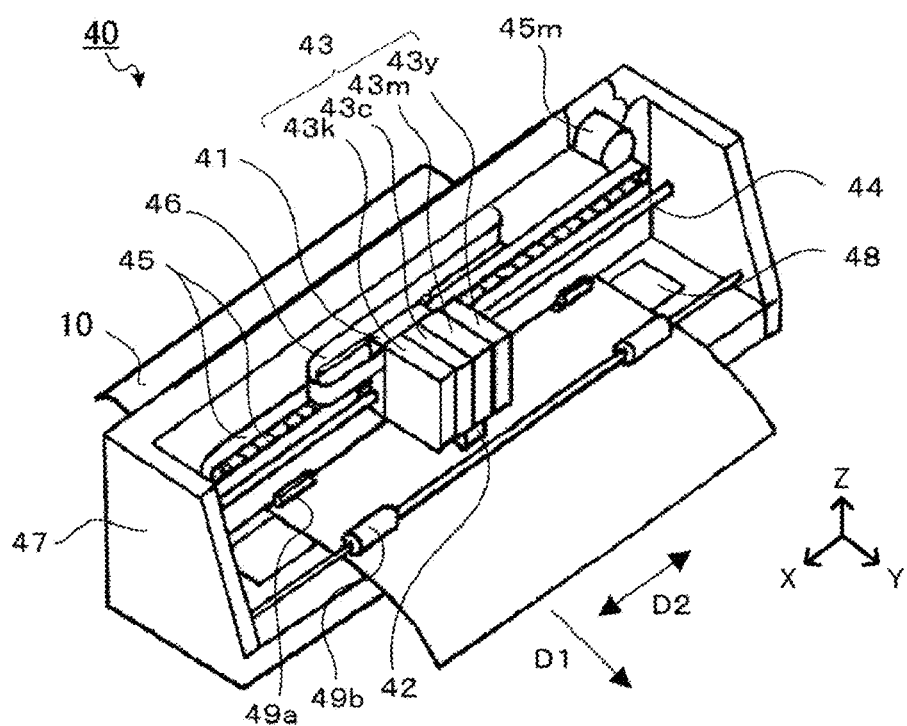
FIG. 5 is a perspective view illustrating configuration for a printer according to an embodiment of the present invention.

FIG. 5 illustrates detailed configuration for the printer 40. As illustrated in FIG. 5, the printer 40 is provided with a carriage 41 that is able to move in a reciprocating manner along a primary scanning direction D2 (the X direction) orthogonal to a secondary scanning direction D1 (the Y direction), which is the direction along which thermally distensible sheets 10 are conveyed.

A print head 42 that performs the printing, and ink cartridges 43 (43k, 43c, 43m, 43y) in which ink is stored, are attached to the carriage 41. Black K, cyan C, magenta M, and yellow Y colored inks are respectively stored in the ink cartridges 43k, 43c, 43m, 43y. The colored inks are each ejected from a corresponding nozzle on the print head 42.

The carriage 41 is slidably supported on a guide rail 44, and is clamped to a drive belt 45. The drive belt 45 is driven by rotation from a motor 45m, whereby the carriage 41, together with the print head 42 and the ink cartridges 43, is moved along the primary scanning direction D2.

A platen 48 is provided to a lower section of a frame 47, in a position opposing the print head 42. The platen 48 extends along the primary scanning direction D2, and configures part of a conveyance path for thermally distensible sheets 10. Feed roller pairs 49a (of which the lower rollers are not illustrated) and discharge roller pairs 49b (of which the lower rollers are not illustrated) are provided along the conveyance path for thermally distensible sheets 10. The feed roller pairs 49a and the discharge roller pairs 49b convey thermally distensible sheets 10 supported by the platen 48 along the secondary scanning direction D1.

The printer 40 is connected to the control unit 30 through a flexible communication cable 46. The control unit 30 controls the print head 42, the motor 45m, the feed roller pairs 49a, and the discharge roller pairs 49b through the flexible communication cable 46. Specifically, the control unit 30 controls the feed roller pairs 49a and the discharge roller pairs 49b so as to cause thermally distensible sheets 10 to be conveyed. The control unit 30 also causes the motor 45m to rotate, causing the carriage 41 to move, so as to cause the print head 42 to be conveyed to an appropriate position along the primary scanning direction D2.

The printer 40 acquires image data from the control unit 30, and performs printing on the basis of the acquired image data. Specifically the printer 40 acquires, as image data, color image data, front foaming data, and rear foaming data. Color image data is data indicating a color image to be printed on the front surface of a thermally distensible sheet 10. The printer 40 prints color images by causing the print head 42 to emit the cyan C, magenta M, and yellow Y inks toward a thermally distensible sheet 10.

Front foaming data is data indicating the portions on the front surface of a thermally distensible sheet 10 that are to be caused to foam and distend. Rear foaming data is data indicating the portions on the rear surface of a thermally distensible sheet 10 that are to be caused to foam and distend. The printer 40 prints grayscale (density) images (grayscale patterns or density patterns) with the color black by causing the print head 42 to emit black K black ink containing carbon black toward a thermally distensible sheet 10. A conversion layer that converts electromagnetic waves into heat is thereby formed on the front surface or the rear surface of a thermally distensible sheet 10. Black ink containing carbon black is an example of a material that converts electromagnetic waves into heat.

Note that a temperature sensor 23 that detects temperature and a humidity sensor 24 that detects humidity are installed in the shape forming system 1. As illustrated in FIGS. 3A and 3C, the temperature sensor 23 and the humidity sensor 24 are, for example, installed in the vicinity of the discharge section 40b of the printer 40, and acquire temperature information and humidity information for the environment in which the shape forming system 1 is installed. Since the temperature sensor 23 and the humidity sensor 24 are installed at a position somewhat removed (a prescribed distance away) from a housing 51 for the irradiation device 50, the temperature sensor 23 and the humidity sensor 24 are able to detect temperature and humidity while minimizing any influence resulting from the application of heat to a thermally distensible sheet 10 in the irradiation device 50.

<Irradiation Device 50>

The irradiation device 50 is an irradiation unit that heats a thermally distensible sheet 10 to be distended as a result of irradiating the thermally distensible sheet 10 with electromagnetic waves. The irradiation device 50 is also, for example, referred to as a heating device or a distension device.

Figure 6:
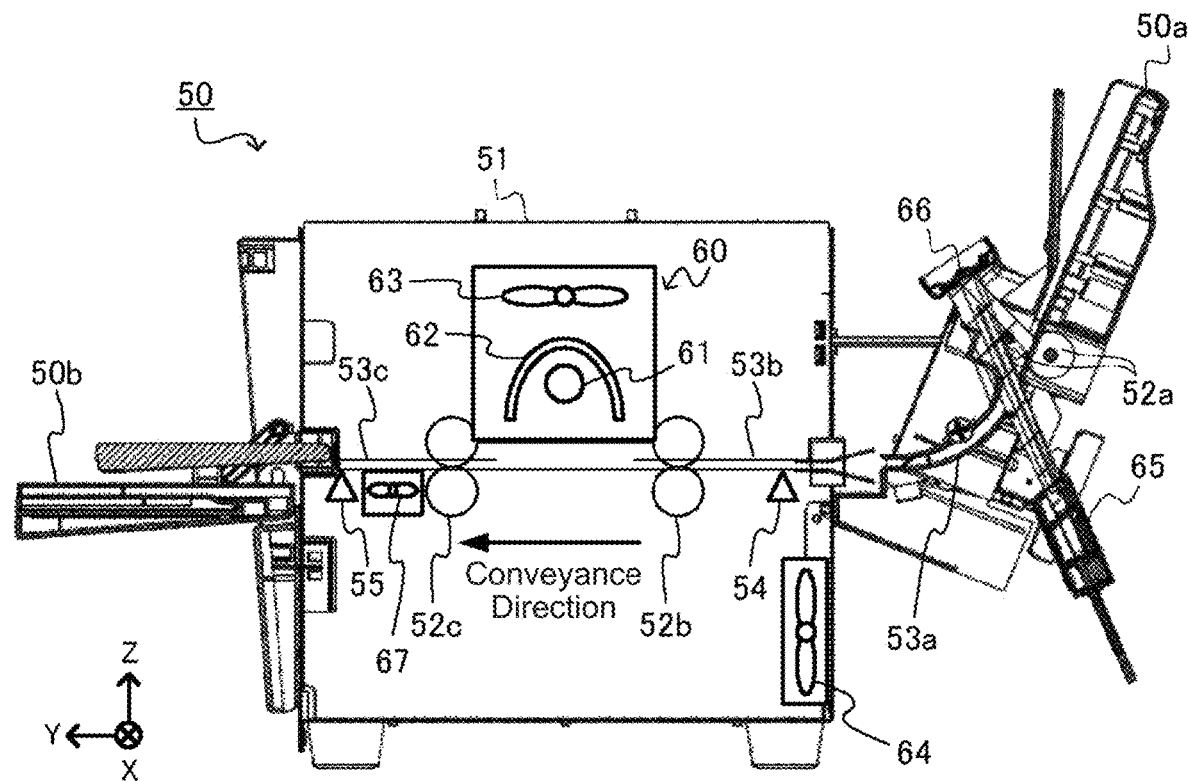
FIG. 6 is a cross-sectional view illustrating configuration for an irradiation device according to an embodiment of the present invention.
Figure 7:
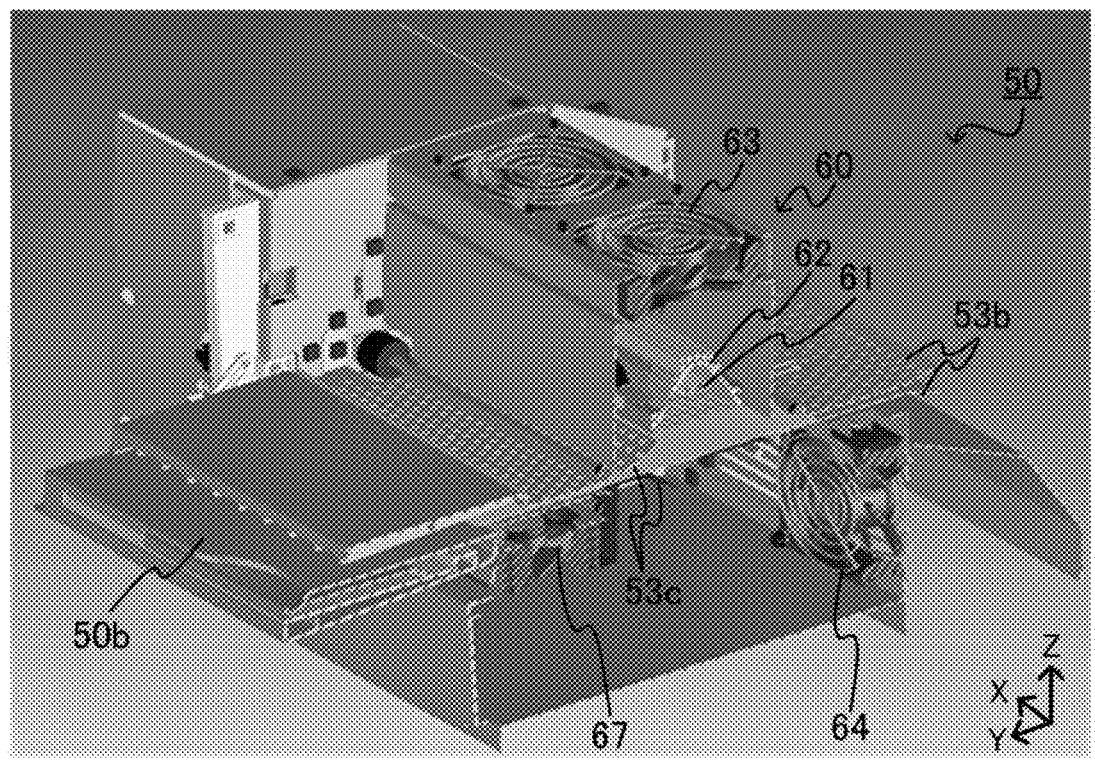
FIG. 7 is a cross-sectional perspective view illustrating configuration inside a housing for the irradiation device according to the embodiment of the present invention.

As illustrated in FIG. 3C, the irradiation device 50 is provided with an intake section 50a for taking in thermally distensible sheets 10, and with a discharge section 50b for discharging thermally distensible sheets 10. As illustrated in FIGS. 6 and 7, the irradiation device 50 is also provided with the housing 51, conveyance roller pairs 52a to 52c, conveyance guides 53a to 53c, and an irradiation unit 60. The irradiation device 50 is connected to the control unit 30 through a non-illustrated cable, and under the control of the control unit 30, the irradiation device 50 radiates electromagnetic waves toward a thermally distensible sheet 10 using the irradiation unit 60 while the conveyance roller pairs 52a to 52c are driven so as to convey the thermally distensible sheet 10. The configuration of the irradiation device 50 will be described below with reference to FIGS. 6 and 7.

The conveyance roller pairs 52a to 52c function as a conveyance unit that conveys thermally distensible sheets 10 taken in through the intake section 50a. Specifically, the conveyance roller pair 52a is installed in the intake section 50a. The conveyance roller pair 52a takes thermally distensible sheets 10 that have been placed in the intake section 50a into the housing 51. The conveyance roller pair 52b is installed on the intake section 50a side of the irradiation unit 60. The conveyance roller pair 52b conveys thermally distensible sheets 10 taken in through the intake section 50a to a position where the thermally distensible sheets 10 are irradiated with electromagnetic waves by the irradiation unit 60. The conveyance roller pair 52c is installed on the discharge section 50b side of the irradiation unit 60. The conveyance roller pair 52c conveys thermally distensible sheets 10 that have been irradiated with electromagnetic waves by the irradiation unit 60 to the discharge section 50b. By conveying thermally distensible sheets 10 in this manner, the conveyance roller pairs 52a to 52c function as a relative movement section that causes thermally distensible sheets 10 and the irradiation unit 60 to move relative to one another.

The conveyance roller pairs 52a to 52c are each provided with a pair of rollers. The conveyance roller pairs 52a to 52c grip thermally distensible sheets 10 using these pairs of rollers. The pairs of rollers are connected to a non-illustrated conveyance motor. The pairs of rollers rotate using driving force that accompanies rotation of the conveyance motor as a source of power. The conveyance motor is, for example, a stepping motor that operates in synchronization with pulsed power. Due to such configuration, the conveyance roller pairs 52a to 52c convey thermally distensible sheets 10 with the front surfaces or rear surfaces thereof facing the irradiation unit 60.

The conveyance guides 53a to 53c guide thermally distensible sheets 10 conveyed by the conveyance roller pairs 52a to 52c from the intake section 50a to the discharge section 50b, passing through a position where the thermally distensible sheets 10 are irradiated with electromagnetic waves by the irradiation unit 60. Specifically, the conveyance guide 53a is installed in the intake section 50a. The conveyance guide 53a is a guide for taking thermally distensible sheets 10 that have been placed in the intake section 50a into the housing 51. The conveyance guide 53b is installed between the intake section 50a and the irradiation unit 60. The conveyance guide 53b is a guide for conveying thermally distensible sheets 10 taken in through the intake section 50a to a position where the thermally distensible sheets 10 are irradiated with electromagnetic waves by the irradiation unit 60. The conveyance guide 53c is installed between the irradiation unit 60 and the discharge section 50b. The conveyance guide 53c is a guide for conveying thermally distensible sheets 10 that have been irradiated with electromagnetic waves by the irradiation unit 60 to the discharge section 50b.

The conveyance guides 53a to 53c are each provided with an upper section and a lower section, and thermally distensible sheets 10 are conveyed between these upper sections and lower sections. In other words, the upper sections and lower sections of the conveyance guides 53a to 53c form a conveyance pathway for thermally distensible sheets 10. As illustrated in FIG. 7, in order to enhance airflow, a large number of openings are provided in the upper sections and lower sections of the conveyance guides 53b, 53c.

An entry sensor 54 is installed partway through the pathway formed by the conveyance guide 53b. The entry sensor 54 detects whether or not a thermally distensible sheet 10 is being conveyed through the conveyance guide 53b. The entry sensor 54 is, for example, provided with a photoemitter and a photodetector on opposite sides of the pathway through which thermally distensible sheets 10 are conveyed by the conveyance guide 53b. The entry sensor 54 detects the presence or absence of a thermally distensible sheet 10 being conveyed through the conveyance guide 53b depending on whether or not light emitted from the photoemitter is received by the photodetector without being blocked by a thermally distensible sheet 10.

An exit sensor 55 is installed partway through pathway formed by the conveyance guide 53c. The exit sensor 55 detects whether or not a thermally distensible sheet 10 is being conveyed through the conveyance guide 53c. The exit sensor 55 is, for example, provided with a photoemitter and a photodetector on opposite sides of the pathway through which thermally distensible sheets 10 are conveyed by the conveyance guide 53c. The exit sensor 55 detects the presence or absence of a thermally distensible sheet 10 being conveyed through the conveyance guide 53c depending on whether or not light emitted from the photoemitter is received by the photodetector without being blocked by a thermally distensible sheet 10.

The irradiation unit 60 is a mechanism that radiates electromagnetic waves. The irradiation unit 60 functions as an irradiation unit that radiates electromagnetic waves toward thermally distensible sheets 10 conveyed by the conveyance roller pairs 52a to 52c. As illustrated in FIG. 6, the irradiation unit 60 is provided with a lamp heater 61 and a reflective plate 62.

The lamp heater 61 is, for example, a halogen lamp. The lamp heater 61 irradiates thermally distensible sheets 10 with electromagnetic waves in the near-infrared region (wavelength: 750-1400 nm), the visible region (wavelength: 380-750 nm), or the mid-infrared region (wavelength: 1400-4000 nm). When a thermally distensible sheet 10 on which black ink containing carbon black has been printed is irradiated with electromagnetic waves, the electromagnetic waves are more efficiently converted into heat at portions of the thermally distensible sheet 10 where the black ink has been printed than at portions of the thermally distensible sheet 10 where black ink has not been printed. Consequently, of the thermally distensible layer 12, the portions where black ink has been printed are mainly heated, and as a result, the portions of the thermally distensible layer 12 where black ink has been printed distend.

The reflective plate 62 is an irradiated body that receives electromagnetic waves radiated from the lamp heater 61. The reflective plate 62 is a mechanism that reflects electromagnetic waves radiated from the lamp heater 61 toward thermally distensible sheets 10. The reflective plate 62 is disposed so as to cover the upper side of the lamp heater 61, and reflects electromagnetic waves radiated upward from the lamp heater 61 downward. Using the reflective plate 62, electromagnetic waves radiated from the lamp heater 61 are able to be efficiently radiated onto thermally distensible sheets 10.

A plurality of cooling fans 63 are provided on the upper side of the reflective plate 62. The cooling fans 63 suck in air from outside the irradiation device 50 and feed air to the reflective plate 62. The cooling fans 63 thereby cool the reflective plate 62, which is heated when the lamp heater 61 is turned on. An exhaust fan 64 is also provided at a lower end portion of the irradiation device 50. The exhaust fan 64 exhausts air inside the housing 51 to the outside to ventilate the inside of the housing 51.

As further illustrated in FIG. 6, a drying fan 67 for drying the conveyance guide 53c is provided to the lower section of the conveyance guide 53c. The drying fan 67 blows air toward the conveyance guide 53c while a thermally distensible sheet 10 is being conveyed by the conveyance roller pairs 52a to 52c. The drying fan 67 thereby dries the conveyance guide 53c, and dries thermally distensible sheets 10 guided and conveyed by the conveyance guide 53c.

Because thermally distensible sheets 10 that have been irradiated with electromagnetic waves by the irradiation unit 60 are conveyed by the conveyance guide 53c, moisture from a thermally distensible sheet 10 that has been foamed or dried by the irradiation of electromagnetic waves tends to adhere to the conveyance guide 53c. If moisture such as this adheres to a thermally distensible sheet 10 conveyed through the conveyance guide 53c, this could result in harm to the thermally distensible sheet 10; for example, the thermally distensible sheet 10 may be stained or damaged. However, since the conveyance guide 53c and the thermally distensible sheet 10 are able to be dried by blowing air on the conveyance guide 53c using the drying fan 67, harm to the thermally distensible sheet 10 is suppressed.

In the intake section 50a, the irradiation device 50 is also provided with a barcode reader 65 and a reflector 66. The barcode reader 65 functions as a reading unit for reading the barcodes B on the rear surfaces of thermally distensible sheets 10. The reflector 66 is a light-reflecting mirror, and is installed on the opposite side of the conveyance path for thermally distensible sheets 10 with respect to the barcode reader 65.

When the front edge of a thermally distensible sheet 10 set in the intake section 50a reaches the position of the barcode reader 65, the barcode reader 65 reads the barcodes B thereon. Specifically, in cases in which the thermally distensible sheet 10 has been inserted into the irradiation device 50 with the front surface thereof facing upward, the barcode reader 65 reads the barcodes B on the rear surface of the thermally distensible sheet 10 without using the reflector 66. In contrast, in cases in which the thermally distensible sheet 10 has been inserted into the irradiation device 50 with the rear surface thereof facing upward, the barcode reader 65 reads the barcodes B on the rear surface of the thermally distensible sheet 10 using the reflector 66.

The irradiation device 50 identifies whether or not a medium set in the intake section 50a is a thermally distensible sheet 10 (whether or not the medium can be used in the irradiation device 50) according to whether or not a barcode B could be read using the barcode reader 65. The reason for this is because there is a possibility that the irradiation device 50 will not operate correctly if a medium that is not a specialized sheet for manufacturing a shaped object is taken into the irradiation device 50.

The barcodes B contain size information indicating whether the size of the thermally distensible sheet 10 is the first size or the second size, and information indicating the thickness of the thermally distensible sheet 10, the type of the base member 11, etc. The irradiation device 50 identifies the size, thickness, and type of a thermally distensible sheet 10 by reading the barcodes B using the barcode reader 65.

Figure 8:
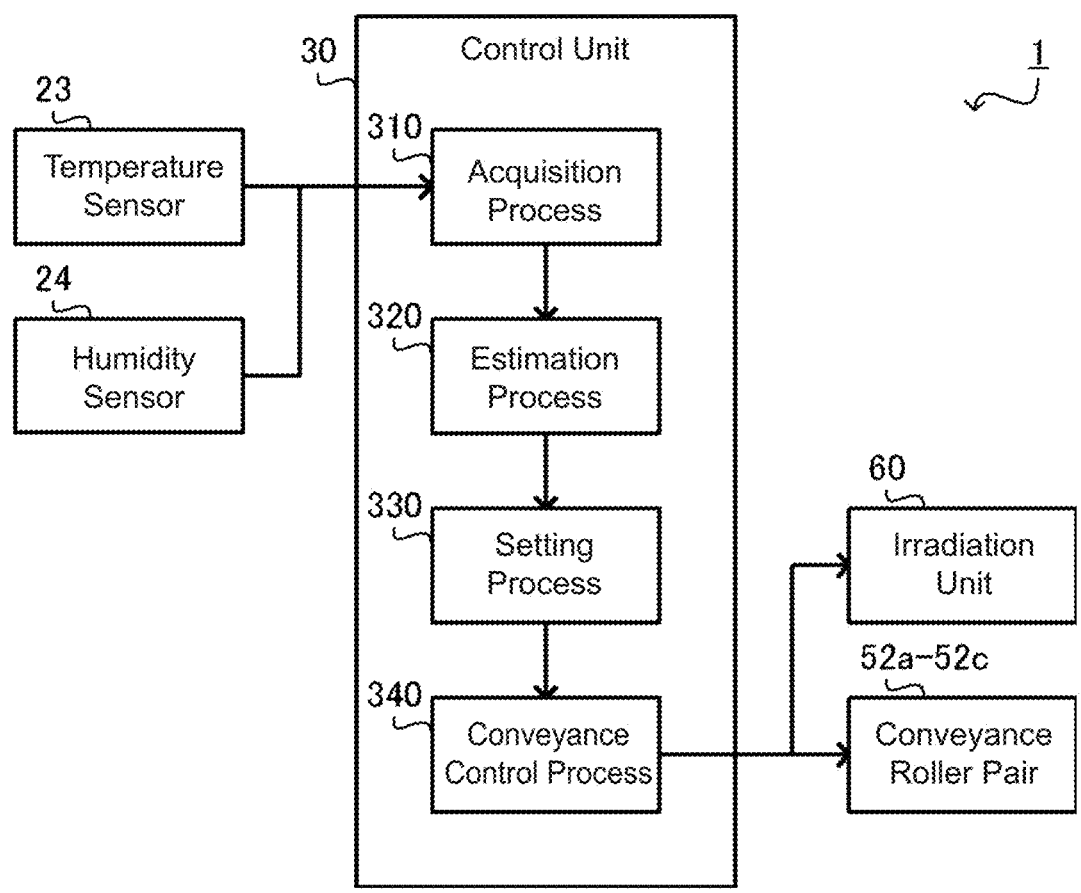
FIG. 8 is a block diagram illustrating the functional configuration of the control unit illustrated in FIG. 4.

Next, the functional configuration of the control unit 30 that controls the operation of the irradiation device 50 will be described with reference to FIG. 8. As illustrated in FIG. 8, the control unit 30 performs an acquisition process 310, an estimation process 320, a setting process 330, and a conveyance control process 340. The controller 31 performs these respective processes and control as a result of the CPU reading a program stored in the ROM into the RAM and then executing this program.

The acquisition process 310 acquires values of temperature and humidity measurements around the irradiation device 50. The temperature and humidity around the irradiation device 50 are indicators used to estimate the amount of moisture contained in a thermally distensible sheet 10. Temperature and humidity are respectively measured using the temperature sensor 23 and the humidity sensor 24 installed in the vicinity of the discharge section 40b of the printer 40. At an appropriate timing in the acquisition process 310, the control unit 30 communicates with the temperature sensor 23 and the humidity sensor 24 over a wired or wireless connection, and acquires the values of temperature and humidity measurements from the temperature sensor 23 and the humidity sensor 24. The acquisition process 310 is realized by the controller 31 working in cooperation with the communication unit 33.

The estimation process 320 estimates the amount of moisture contained in a thermally distensible sheet 10 on the basis of values of temperature and humidity measurements acquired by the acquisition process 310. Depending on the surrounding environment, the inside of a thermally distensible sheet 10, for example the base member 11, may contain moisture. The manner in which heat is transmitted within a thermally distensible sheet 10 changes depending on the amount of moisture contained in the thermally distensible sheet 10, and this influences the degree of distension of the thermally distensible sheet 10 when the thermally distensible sheet 10 is heated and distends in the irradiation device 50. Therefore, in order to properly control the degree of distension of thermally distensible sheets 10 in the irradiation device 50, the estimation process 320 estimates the amount of moisture contained in the thermally distensible sheets 10.

That is, in the estimation process 320, an amount of water vapor obtained from values of temperature and humidity measurements acquired in the acquisition process 310 is evaluated as the amount of moisture contained in a thermally distensible sheet 10, and the estimation process 320 measures the amount of moisture in the environment in which the shape forming system 1 is placed. The estimation process 320 thereby estimates the amount of moisture in the air that would influence a thermally distensible sheet 10 when the thermally distensible sheet 10 distends upon being irradiated with electromagnetic waves by the irradiation device 50.

Specifically, the estimation process 320 calculates an amount of water vapor around the irradiation device 50 on the basis of a value for a temperature measurement and a value for a humidity measurement acquired in the acquisition process 310. The amount of water vapor around the irradiation device 50 is the amount of water vapor per unit volume contained in the air of the environment in which the irradiation device 50 is installed. The estimation process 320 estimates the amount of moisture contained in a thermally distensible sheet 10 using the calculated amount of water vapor as an indicator thereof.

The reason that the amount of water vapor is used as an indicator is because whereas temperature and humidity are liable to change in a comparatively short amount of time, the amount of water vapor contained in the air will not be drastically changed even if there is a change in temperature and humidity. The environment in which the shape forming system 1 is placed is often the same as, or resembles, the environment in which thermally distensible sheets 10 have been stored. Consequently, the amount of water vapor in the air of the environment in which the shape forming system 1 is placed is a good indicator for estimating the amount of moisture contained in thermally distensible sheets 10 in that environment.

More specifically, the amount of water vapor in the air (water vapor density) is determined by the product of the calculated saturated water vapor density and the measured humidity. Assuming that water vapor is an ideal gas, saturated water vapor density (units: g/m^3) is determined as a function of temperature T (units: ° C.) as in Equation (1) below. Here, e(T) in Equation (1) represents saturated water vapor pressure (units: hPa). Saturated water vapor pressure is approximately determined as in Equation (2) below. Note that the "^" symbol in Equation (2) represents exponentiation.

$$\text{Saturated water vapor density } a(T) = 217 \times e(T)/(T+273.15) \quad (1)$$

$$\text{Saturated water vapor pressure } e(T) = 6.1078 \times 10\char`\^(7.5\,T/\{T+237.3\}) \quad (2)$$

In the estimation process 320, the values of temperature and humidity measurements acquired in the acquisition process 310 are applied to Equation (1) and Equation (2) above to calculate an water vapor density. Then, the estimation process 320 uses the calculated water vapor density as an estimated amount of moisture contained in a thermally distensible sheet 10. The estimation process 320 is realized by the controller 31.

The setting process 330 sets a speed of movement for thermally distensible sheets 10 in accordance with the amount of moisture estimated in the estimation process 320. The speed of movement for thermally distensible sheets 10 is a speed of conveyance for thermally distensible sheets 10 conveyed by the conveyance roller pairs 52a to 52c in the irradiation device 50, and corresponds to a speed of movement of thermally distensible sheets 10 relative to the irradiation unit 60, which has a fixed position. In order to have the degree of distension of thermally distensible sheets 10 be consistent even when the amount of moisture contained in the thermally distensible sheets 10 fluctuates, the setting process 330 sets the speed of conveyance of the thermally distensible sheets 10 to different speeds in accordance with the amount of moisture therein. The setting process 330 thereby adjusts the amount of electromagnetic waves irradiated onto the thermally distensible sheets 10 per unit area.

Figure 9:
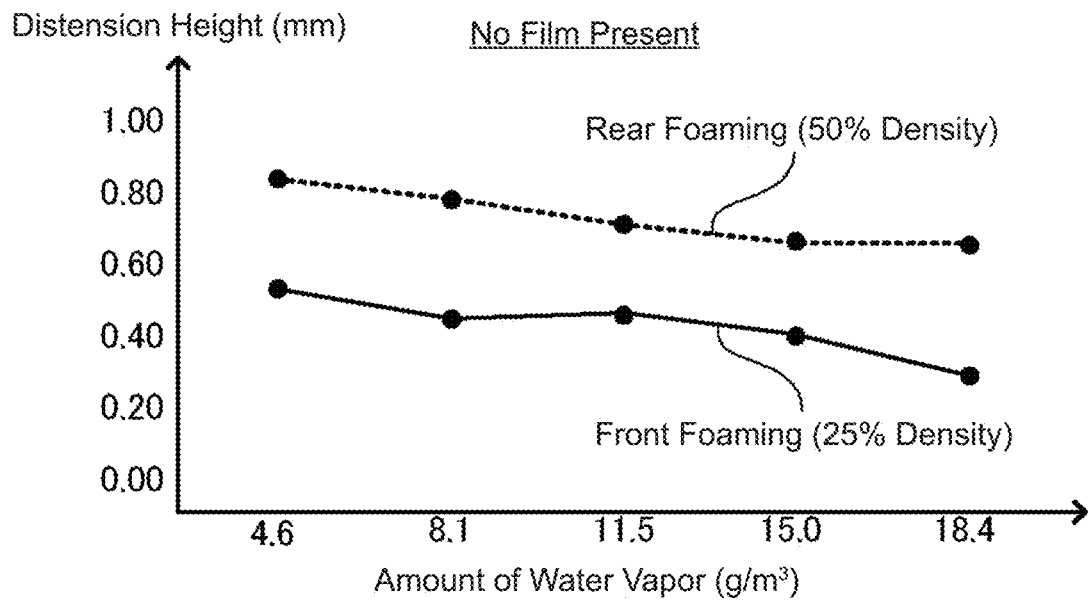
FIG. 9 is a first graph illustrating relationships between amounts of water vapor and the distension heights of thermally distensible sheets in an embodiment of the present invention.
Figure 10:
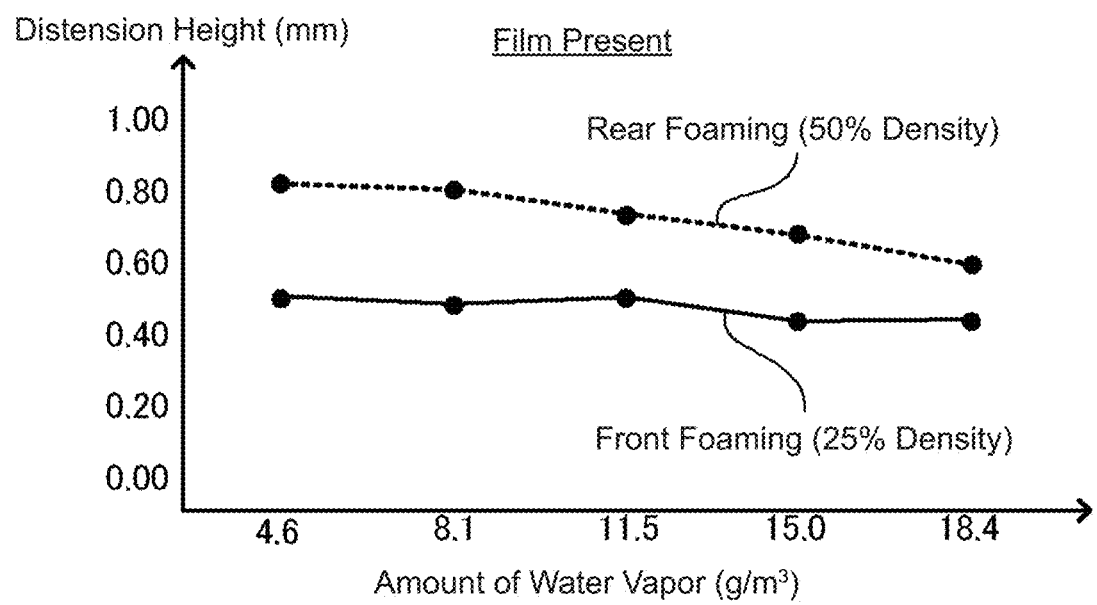
FIG. 10 is a second graph illustrating relationships between amounts of water vapor and the distension heights of thermally distensible sheets in an embodiment of the present invention.

FIGS. 9 and 10 illustrate relationships between amounts of water vapor and the distension heights of thermally distensible sheets 10. Here, FIG. 9 illustrates relationships between amounts of water vapor and distension heights for thermally distensible sheets 10 to which a protection film for protecting the ink-accepting layer 13 has not been applied to the front surface of the ink-accepting layer 13, and FIG. 10 illustrates relationships between amounts of water vapor and distension heights for thermally distensible sheets 10 to which such a protection film has been applied to the front surface of the ink-accepting layer 13. Here, the peelable protection film is provided to cover the ink-accepting layer 13 before black ink for causing the thermal distension (with irradiation of light) is being printed thereon so that the black ink does not permeate into the ink-accepting layer 13 and will not be mixed with color ink that will be applied in a later step. The protection film may be a thin sheet-like member made of a thermoplastic resin, such as polyethylenes, polyvinyl alcohols, polypropylenes, or polyvinyl chlorides, or copolymers of any of these. For example, the protection film may be made of an ethylene-vinyl alcohol copolymer. Since the protection film is to be peeled off from the thermally distensible layer 12, the protection film is adhered onto the thermally distensible layer 12 so as to be peelable. For instance, first, using black ink, a density image is formed on the protection film that has been provided on a front surface of the thermally distensible sheet 10, and thereafter, the black ink is irradiated with light to cause the thermally distensible layer 12 to distend according to the density image of the printed black ink. Then, the protection film is peeled off to expose the surface of the ink-accepting layer 13, and colored ink is printed on the exposed surface of the ink-accepting layer 13. In this manner, the black ink that defines the height of distension according to the printed density is not mixed with color ink that is subsequently applied; in other words, with the use of the peelable protection film, the hue of the color expressed by the color ink is not influenced by the black ink.

In FIGS. 9 and 10, the solid line represents the distension heights of thermally distensible sheets 10 for which, in a state in which a conversion layer for converting electromagnetic waves into heat had been printed on the front surfaces of the thermally distensible sheets 10 at 25% density, the front surfaces of the thermally distensible sheets 10 were irradiated with electromagnetic waves by the irradiation unit 60, in other words when front foaming was performed. In contrast, the dashed line represents the distension heights of thermally distensible sheets 10 for which, in a state in which a conversion layer for converting electromagnetic waves into heat had been printed on the rear surfaces of the thermally distensible sheets 10 at 50% density, the rear surfaces of the thermally distensible sheets 10 were irradiated with electromagnetic waves by the irradiation unit 60, in other words when rear foaming was performed.

As illustrated in FIGS. 9 and 10, there is a tendency for the distension height of thermally distensible sheets 10 to become smaller as the amount of water vapor increases, that is, as the amount of moisture contained in the thermally distensible sheets 10 increases. Consequently, the setting process 330 sets the speed of movement of thermally distensible sheets 10 to a lower speed the greater the amount of moisture estimated in the estimation process 320. This increases the amount of electromagnetic waves that the thermally distensible sheets 10 are irradiated with per unit area. In converse, the setting process 330 sets the speed of movement of thermally distensible sheets 10 to a higher speed the smaller the amount of moisture estimated in the estimation process 320. This decreases the amount of electromagnetic waves that the thermally distensible sheets 10 are irradiated with per unit area.

Such relationships between amounts of water vapor and distension heights are measured in advance and stored in the storage section 32. In the setting process 330, the relationships between amounts of water vapor and distension heights stored in the storage section 32 are referenced to set the speed of movement of thermally distensible sheets 10. The setting process 330 is realized by the controller 31 working in cooperation with the storage section 32.

Here, in the setting process 330, the speed of movement of a thermally distensible sheet 10 is set in accordance with the type of the thermally distensible sheet 10 and according to whether the thermally distensible sheet 10 is front-foamed or rear-foamed. Specifically, as for example illustrated in FIGS. 9 and 10, the relationship between distension height and the amount of water vapor changes depending on whether or not a protection film is applied to the front surface of a thermally distensible sheet 10. Although not illustrated in the drawings, the manner in which heat is transmitted also changes depending on the type of the base member 11 configuring a thermally distensible sheet 10, and depending on the amount of moisture contained therein. In this manner, because the relationship between distension height and the amount of water vapor changes depending on the type of thermally distensible sheet 10, the setting process 330 sets the speed of movement of thermally distensible sheets 10 to different speeds in accordance with the type of thermally distensible sheet 10.

Further, in general, there is a difference in the manner in which heat is transmitted in front foaming and rear foaming. Specifically, because the base member 11 is present between the rear surface and the thermally distensible layer 12, more so than front foaming, there is a tendency for rear foaming to exert greater influence on the manner in which heat is transmitted due to the amount of moisture contained in a thermally distensible sheet 10. Accordingly, in accordance with the amount of moisture estimated in the estimation process 320, the setting process 330 causes the speed of movement to change more in cases in which the rear surface of a thermally distensible sheet 10, in other words the opposite side face of the thermally distensible sheet 10 to the face with the thermally distensible layer 12, is irradiated with electromagnetic waves by the irradiation unit 60 than in cases in which the front surface of a thermally distensible sheet 10, in other words the face with the thermally distensible layer 12, is irradiated with electromagnetic waves by the irradiation unit 60.

Figure 11:
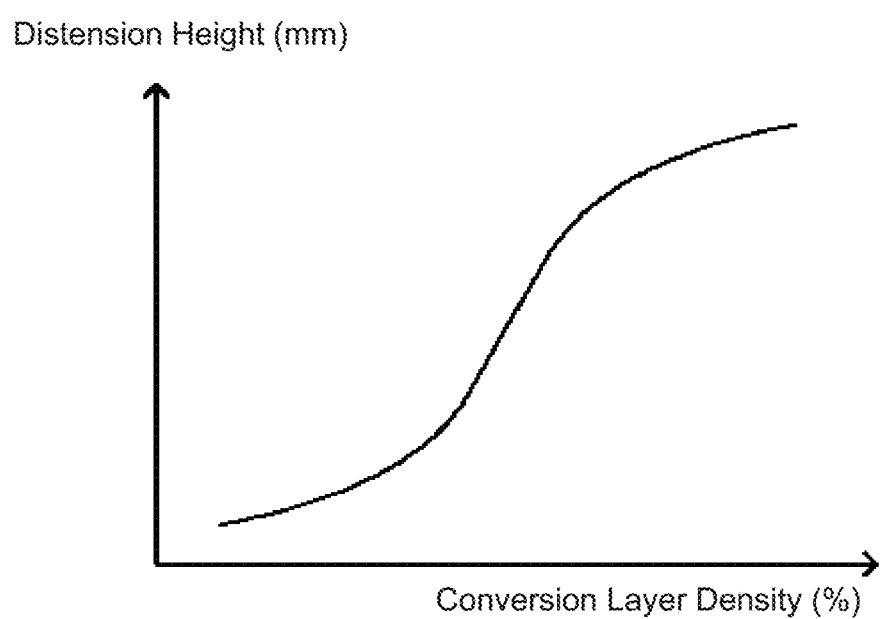
FIG. 11 is a graph roughly illustrating a relationship between the distension height of a thermally distensible sheet and the density of a conversion layer that has been printed on the thermally distensible sheet for converting electromagnetic waves into heat in an embodiment of the present invention.

Note that as illustrated in FIG. 11, the distension height of a thermally distensible sheet 10 fluctuates depending on the density of the conversion layer for converting electromagnetic waves into heat printed on the front surface or the rear surface of the thermally distensible sheet 10. Accordingly, the setting unit 330 may set the speed of movement in accordance with the density of the conversion layer printed on the front surface or the rear surface of a thermally distensible sheet 10. For example, in cases in which the density of the conversion layer printed on the front surface or the rear surface of a thermally distensible sheet 10 differs according to position, the setting process 330 may set the speed of movement in accordance with the average density of the conversion layer (print pattern) printed on that surface.

The conveyance control process 340 causes thermally distensible sheets 10 to move at the speed of movement set in the setting process 330 while causing the irradiation unit 60 to radiate electromagnetic waves. Specifically, the conveyance control process 340 drives the conveyance roller pairs 52a to 52c at a rotation speed corresponding to the speed of movement set in the setting process 330 so as to convey a thermally distensible sheet 10. Then, the conveyance control process 340 drives the irradiation unit 60 so as to cause electromagnetic waves to be radiated toward the thermally distensible sheet 10 being conveyed. Thereby, the conveyance control process 340 causes the portions of the thermally distensible sheet 10 where a conversion layer was printed to distend, manufacturing a shaped object. The conveyance control process 340 is realized by the controller 31 working in cooperation with the communication unit 33.

<Shaped Object Manufacturing Process>

Figure 12:
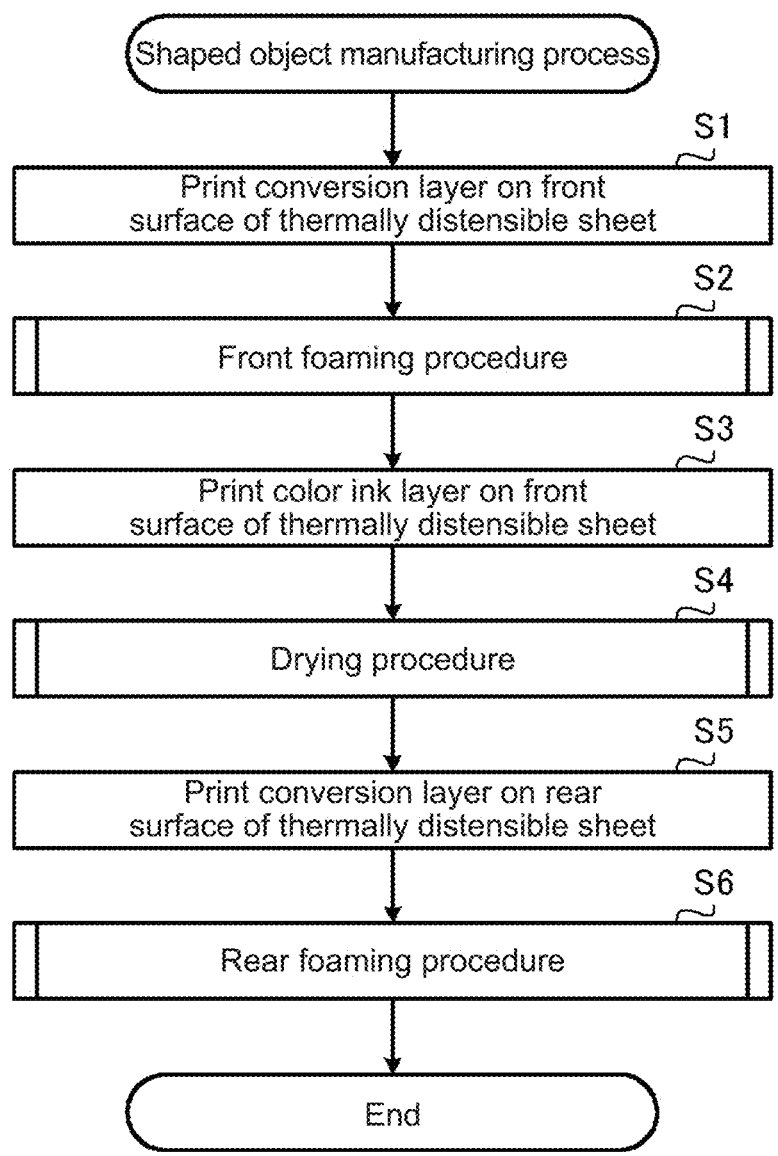
FIG. 12 is a flowchart illustrating the flow of a manufacturing process for a shaped object performed by a shape forming system according to an embodiment of the present invention.

Next, the flow of a manufacturing process for a shaped object performed by the shape forming system 1 will be described, with reference to the flowchart illustrated in FIG. 12 and the cross-sectional views of a thermally distensible sheet 10 illustrated in FIGS. 13A to 13E.

Figure 13A:
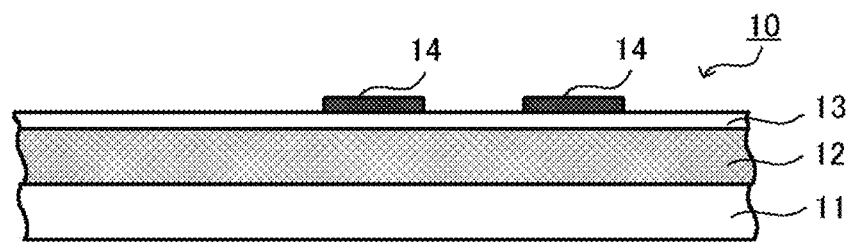
FIGS. 13A to 13E are diagrams illustrating, in stages, the manufacture of a shaped object on the thermally distensible sheet illustrated in FIG. 1.

Firstly, a user prepares a thermally distensible sheet 10 on which a shaped object has not yet been formed, and via the operation unit, specifies color image data, front foaming data, and rear foaming data. Then the user inserts the thermally distensible sheet 10 into the printer 40 with the front surface thereof facing upward. The printer 40 prints a conversion layer 14 on the front surface of the thermally distensible sheet 10 that has been inserted (step S1). The conversion layer 14 is a layer formed by ink containing a material that converts electromagnetic waves into heat, for example, black ink containing carbon black. The printer 40 ejects black ink containing carbon black onto the front surface of the thermally distensible sheet 10 in accordance with the front foaming data that has been specified. As a result, as illustrated in FIG. 13A, the conversion layer 14 is formed on the ink-accepting layer 13.

Figure 13B:
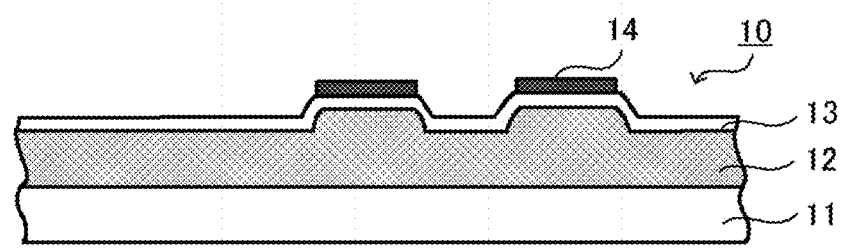

Secondly, the user inserts the thermally distensible sheet 10 on which the conversion layer 14 has been printed into the irradiation device 50 with the front surface thereof facing upward. The irradiation device 50 performs a front foaming procedure on the thermally distensible sheet 10 that has been inserted (step S2). Specifically, the irradiation device 50 irradiates the front surface of the thermally distensible sheet 10 with electromagnetic waves using the irradiation unit 60. The heat conversion material contained in the conversion layer 14 printed on the front surface of the thermally distensible sheet 10 absorbs electromagnetic waves irradiated thereon, thereby generating heat. As a result, the conversion layer 14 generates heat, and as illustrated in FIG. 13B, the regions of the thermally distensible layer 12 in the thermally distensible sheet 10 where the conversion layer 14 has been printed distend and rise up.

Figure 13C:
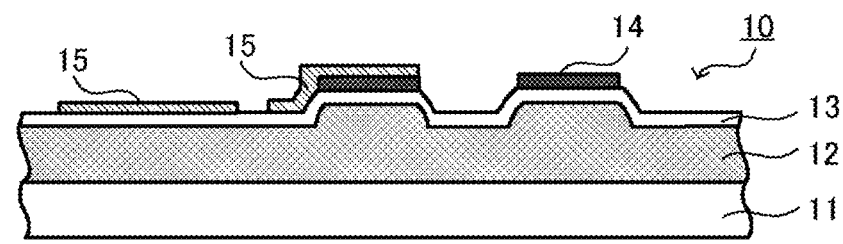

Thirdly, the user inserts the thermally distensible sheet 10, of which part of the thermally distensible layer 12 is distended, into the printer 40 with the front surface thereof facing upward. The printer 40 prints a color ink layer 15 on the front surface of the thermally distensible sheet 10 that has been inserted (step S3). Specifically, the printer 40 ejects cyan C, magenta M, and yellow Y colored inks onto the front surface of the thermally distensible sheet 10 in accordance with the color image data that has been specified. As a result, as illustrated in FIG. 13C, the color ink layer 15 is formed on the ink-accepting layer 13.

Fourthly, the user inserts the thermally distensible sheet 10 on which the color ink layer 15 has been printed into the irradiation device 50 with the rear surface thereof facing upward. The irradiation device 50 performs a drying procedure on the thermally distensible sheet 10 that has been inserted (step S4). Specifically, the irradiation device 50 irradiates the rear surface of the thermally distensible sheet 10 with electromagnetic waves using the irradiation unit 60. This causes solvent contained in the color ink layer 15 printed on the front surface of the thermally distensible sheet 10 to evaporate, and dries the color ink layer 15.

Figure 13D:
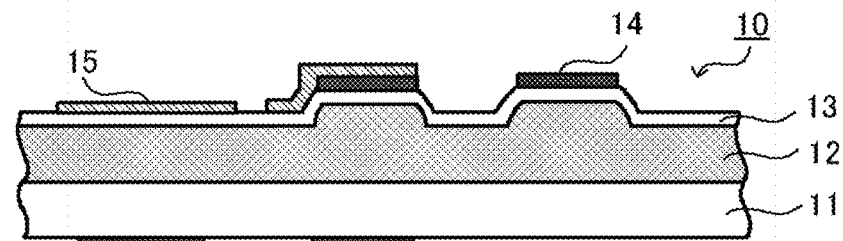

Fifthly, the user inserts the thermally distensible sheet 10 on which the color ink layer 15 has been printed into the printer 40 with the rear surface thereof facing upward. The printer 40 prints a conversion layer 16 on the rear surface of the thermally distensible sheet 10 that has been inserted (step S5). Similarly to the conversion layer 14 printed on the front surface of the thermally distensible sheet 10, the conversion layer 16 is a layer formed by a material that converts electromagnetic waves into heat, specifically, black ink containing carbon black. The printer 40 ejects black ink containing carbon black onto the rear surface of the thermally distensible sheet 10 in accordance with the rear foaming data that has been specified. As a result, as illustrated in FIG. 13D, the conversion layer 16 is formed on the rear surface of the base member 11.

Figure 13E:
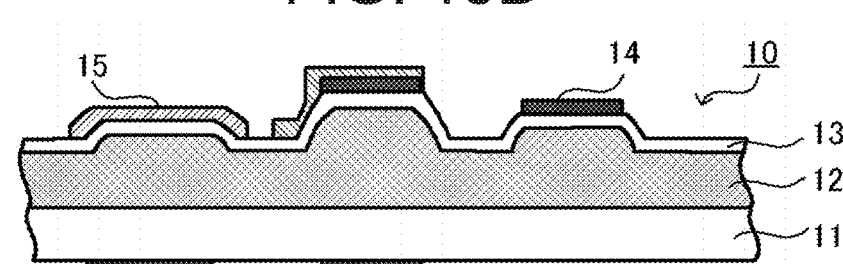

Sixthly, the user inserts the thermally distensible sheet 10 on which the conversion layer 16 has been printed into the irradiation device 50 with the rear surface thereof facing upward. The irradiation device 50 performs a rear foaming procedure on the thermally distensible sheet 10 that has been inserted (step S6). Specifically, the irradiation device 50 irradiates the rear surface of the thermally distensible sheet 10 with electromagnetic waves using the irradiation unit 60. The conversion layer 16 printed on the rear surface of the thermally distensible sheet 10 absorbs electromagnetic waves irradiated thereon, thereby generating heat. As a result, as illustrated in FIG. 13E, the regions of the thermally distensible layer 12 in the thermally distensible sheet 10 where the conversion layer 16 has been printed distend and rise up.

Through such a sequence, a shaped object is formed on the front surface of the thermally distensible sheet 10.

Note that in FIGS. 13A to 13E, in order to facilitate explanation, the conversion layer 14 is illustrated formed on the ink-accepting layer 13. However, to be more precise, the conversion layer 14 is formed within the ink-accepting layer 13 since the ink is accepted into the ink-accepting layer 13. Similar also applies to the color ink layer 15, and to the conversion layer 16 on the rear side of the thermally distensible sheet 10.

A conversion layer 14, 16 may be formed on only the front side or on only the rear side of a thermally distensible sheet 10. In cases in which the only a conversion layer 14 on the front side of a thermally distensible sheet 10 is employed to cause distension of the thermally distensible layer 12, steps S1 to S4 of the process described above are performed. In cases in which only a conversion layer 16 on the rear side of a thermally distensible sheet 10 is employed to cause distension of the thermally distensible layer 12, steps S3 to S6 of the process described above are performed. Further, the rear foaming procedure in steps S5, S6 may be performed before the front foaming procedure in steps S1, S2, and the procedures for printing and drying the color ink layer 15 in steps S3, S4 may be performed before the front foaming procedure in steps S1, S2. Alternatively, the front foaming procedure in step S2 may be performed after printing the conversion layer 14 on the front side of a thermally distensible sheet 10 in step S1 and printing the color ink layer 15 in step S3. In such manner, steps S1 to S6 described above may be performed having been rearranged in various ways.

Figure 14:
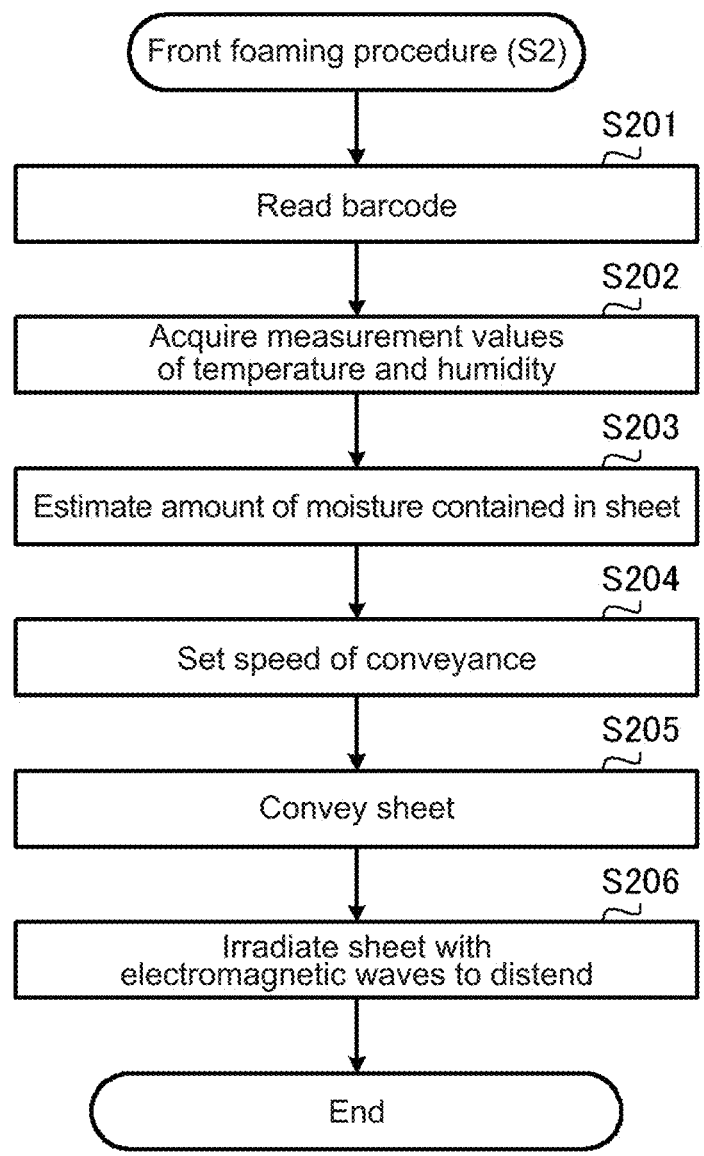
FIG. 14 is a flowchart illustrating the flow of a front foaming procedure performed by the irradiation device according to the embodiment of the present invention.

Next, the front foaming procedure in step S2 will be described with reference to FIG. 14. The front foaming procedure illustrated in FIG. 14 begins when, in a state in which a conversion layer 14 has been printed on the front surface thereof, a thermally distensible sheet 10 is set in the intake section 50a of the irradiation device 50 with the front surface facing up.

When the front foaming procedure begins, the controller 31 reads a barcode B (step S201). Specifically, using the barcode reader 65, the controller 31 reads a barcode B provided on an edge on the rear surface of the thermally distensible sheet 10 set in the intake portion 50a. The controller 31 thereby distinguishes whether or not the thermally distensible sheet 10 set in the intake portion 50a is the right kind of sheet. By reading the barcode B, the controller 31 also acquires information indicating the size, thickness, and type of the thermally distensible sheet 10 set in the intake portion 50a.

Upon reading the barcode B, the controller 31, performing the acquisition process 310, acquires values of temperature and humidity measurements from the temperature sensor 23 and the humidity sensor 24 (step S202). The controller 31 thereby acquires information indicating the current temperature and humidity around the irradiation device 50.

Upon acquiring values of temperature and humidity measurements, the controller 31, performing the estimation process 320, estimates the amount of moisture contained in the thermally distensible sheet 10 (step S203). Specifically, the controller 31 calculates the amount of water vapor contained in the air from the values of temperature and humidity measurements that were acquired, and estimates the amount of moisture contained in the thermally distensible sheet 10 to be the amount of water vapor that was calculated.

Upon estimating the amount of moisture contained in the thermally distensible sheet 10, the controller 31, performing the setting process 330, sets the speed of conveyance of the thermally distensible sheet 10 in accordance with the estimated amount of moisture (step S204). Specifically, the controller 31 sets the speed of conveyance considering given to a relationship, measured in advance, between an amount of moisture and distension height of a thermally distensible sheet 10. At such time, the controller 31 sets the speed of conveyance in accordance with the type of thermally distensible sheet 10 obtained through reading the barcode B, or according to whether front foaming or rear foaming is to be performed.

Upon setting the speed of conveyance, the controller 31, performing the conveyance control process 340, begins conveying the thermally distensible sheet 10 (step S205). Specifically, the controller 31 drives the conveyance roller pairs 52a to 52c so as to start conveying the thermally distensible sheet 10 set in the intake section 50a into the housing 51.

Upon beginning to convey the thermally distensible sheet 10, the controller 31 irradiates the thermally distensible sheet 10 with electromagnetic waves and causes the thermally distensible sheet 10 to distend (step S206). Specifically, while detecting the position of the conveyed thermally distensible sheet 10 using the entry sensor 54 and the exit sensor 55, at appropriate timings, the controller 31 causes the irradiation unit 60 to start radiating electromagnetic waves, and causes the irradiation unit 60 to stop radiating electromagnetic waves. This step distends the portions of the thermally distensible sheet 10 where the conversion layers 14, 16 were printed, manufacturing a shaped object. Then, front foaming procedure illustrated in FIG. 14 ends.

Note that in the drying procedure in step S4, and in the rear foaming procedure in step S6, the controller 31 executes processing similar to steps S201 to S206 in the front foaming procedure. However, since the relationship between the amount of moisture contained in a thermally distensible sheet 10 and the distension height of a thermally distensible sheet 10 differs for front foaming and rear foaming, in the rear foaming procedure, the controller 31 sets the speed of conveyance according to the estimated amount of moisture on the basis of a different reference than in the front foaming procedure. Further, in the drying procedure, since the drying procedure is a procedure for drying the color ink layer 15 and is not a procedure for causing distension of the thermally distensible sheet 10, the controller 31 sets the speed of conveyance according to the estimated amount of moisture on the basis of a different reference than in the front foaming procedure.

As described above, the irradiation device 50 according to the present embodiment is a device that irradiates a thermally distensible sheet 10 conveyed by the conveyance roller pairs 52a to 52c with electromagnetic waves. The irradiation device 50 estimates the amount of moisture contained in the thermally distensible sheet 10, and causes the thermally distensible sheet 10 to be conveyed at a speed of conveyance set according to the estimated amount of moisture. This allows the degree of distension of the thermally distensible sheet 10 to be properly controlled even if the amount of moisture contained in the thermally distensible sheet 10 changes according to the surrounding environment. This results in precise distension of thermally distensible sheets 10 in the irradiation device 50 such that desired shaped objects are consistently obtained.

Modification Examples

An embodiment of the present invention has been described above. However, this embodiment is merely exemplary, and the scope of application of the present invention is not limited thereto. That is, various other modifications of the present invention are possible, and the scope of the present invention covers all such modifications.

For example, in the embodiment described above, the irradiation device 50 causes a thermally distensible sheet 10 to distend using a configuration whereby the thermally distensible sheet 10 is irradiated with electromagnetic waves from the irradiation unit 60, which has a fixed position, while the thermally distensible sheet 10 is conveyed using conveyance roller pairs 52a to 52c. However, in the present invention, the irradiation device 50 may be provided with a movement mechanism that moves the irradiation unit 60, and the irradiation device 50 causes a thermally distensible sheet 10 to distend using a configuration whereby the irradiation unit 60 is caused to radiate electromagnetic waves while the irradiation unit 60 is moved across a fixedly-positioned thermally distensible sheet 10. In this case, the movement mechanism that moves the irradiation unit 60 functions as the relative movement section. In addition, instead of the speed of conveyance of a thermally distensible sheet 10, the setting process 330 sets a speed of movement for the irradiation unit 60 in accordance with the amount of moisture estimated in the estimation process 320. Thus, the irradiation device 50 may cause a thermally distensible sheet 10 to distend using any configuration whereby the thermally distensible sheet 10 and the irradiation unit 60 can be caused to be move relative to one another.

In the embodiment described above, thermally distensible sheets 10 are provided with a base member 11, a thermally distensible layer 12, and an ink-accepting layer 13. However, in the present invention, the configuration of thermally distensible sheets 10 is not limited thereto. For example, thermally distensible sheets 10 may be configured without an ink-accepting layer 13. Alternatively, between the base member 11 and the thermally distensible layer 12, between the thermally distensible layer 12 and the ink-accepting layer 13, on the front surface of the ink-accepting layer 13, or on the rear surface of the base member 11, the thermally distensible sheets 10 may be provided with a layer of another freely selected material.

The printing method of the printer 40 is not limited to inkjet printing, and may be any other printing method. The conversion layers 14, 16 may be formed using a material other than black ink containing carbon black, so long as this material readily converts electromagnetic waves into heat. In this case, the conversion layers 14, 16 may be formed using a device other than the printer 40.

In the embodiment described above, the printer 40 and the irradiation device 50 are united so as to configure a single shape forming system 1, and operation of the printer 40 and the irradiation device 50 is controlled by the control unit 30 shared therebetween. However, in the shape forming system 1 according to the present invention, the printer 40 and the irradiation device 50 may be mutually independent devices.

Further, configuration may be such that the irradiation device 50 is provided with the functionality of the control unit 30 in the embodiment described above, that is, provided with at least part of the functionalities of the acquisition process 310, the estimation process 320, the setting process 330, and the conveyance control process 340 illustrated in FIG. 8. In other words, configuration may be such that the irradiation device 50 is independent, and is provided with functionality to cause a thermally distensible sheet 10 and the irradiation unit 60 to move relative to one another while causing the irradiation unit 60 to radiate electromagnetic waves, thereby causing the thermally distensible sheet 10 to distend.

In the embodiment described above, the control unit 30 is provided with a CPU, and through the functionality of the CPU respectively performs the acquisition process 310, the estimation process 320, the setting process 330, and the conveyance control process 340. However, in the present invention, instead of a CPU, the control unit 30 may, for example, be provided with an application-specific integrated circuit (ASIC), a field-programmable gate array (FPGA), or a variety of control circuits or other dedicated hardware. In such cases, processes may be performed by separate pieces of hardware, or the processes may be performed together by a single piece of hardware. Configuration may also be such that some of the processes are performed using dedicated hardware, and other processes are performed using software or firmware.

Note in addition to being able to provide an irradiation device pre-equipped with configuration for implementing functionality according to the present invention, a program can be provided that causes a computer for controlling an irradiation device to implement the functional configuration of the irradiation device 50 presented by way of example in the embodiment described above. That is, a program for causing the implementation of the functionalities of the irradiation device 50 presented by way of example in the embodiment described above can be provided such that a CPU or the like that controls an existing information processing device or the like can execute the program so as to implement the functionalities.

Further, any method may be used to provide such a program. A program can be provided stored on a computer-readable storage medium such as, for example, a floppy disk, a compact disc read-only memory (CD-ROM), a digital versatile disc-read only memory (DVD-ROM), or a memory card. A program can also be superimposed on a carrier wave and provided via a communication medium such as the Internet. For example, a program may be posted to and distributed by a bulletin board system (BBS) over a communication network. Then, configuration may be such that the processes described above are able to be executed by starting this program and, under the control of an operating system (OS), executing this program similarly to other applications.

Although a preferred embodiment of the present invention has been described, it should be noted that the present invention is not limited to this specific embodiment, and the accompanying claims and their equivalents are intended to cover all modifications and variations as would fall within the scope and spirit of the present invention.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An irradiation device for causing distension of a thermally distensible sheet that distends due to heat, comprising:
   a temperature sensor;
   a humidity sensor;
   an irradiation unit that irradiates the thermally distensible sheet with electromagnetic waves; and
   a controller configured to:
      estimate an amount of moisture contained in the thermally distensible sheet on the basis of values of measurements from the temperature sensor and the humidity sensor,
      set a relative speed between the irradiation unit and the thermally distensible sheet in accordance with the estimated amount of moisture in the thermally distensible sheet, and
      cause the irradiation unit or the thermally distensible sheet to move relative to each other at the relative speed that has been set while irradiating the thermally distensible sheet with the electromagnetic waves.

2. The irradiation device according to claim 1,
wherein the thermally distensible sheet comprises a base member and a thermally distensible layer formed on the base member, and
wherein the controller is configured to set the relative speed more sensitively with respect to changes in the estimated amount of moisture when the irradiation unit radiates the electromagnetic waves onto the thermally distensible sheet from a side of the base member than when the irradiation unit radiates the electromagnetic waves onto the thermally distensible sheet from a side of the thermally distensible layer.

3. The irradiation device according to claim 2,
wherein the temperature sensor and the humidity sensor measure a temperature and a humidity, respectively, in an ambient air around the irradiation device, and
wherein the controller is configured to estimate the amount of moisture by calculating the water vapor density in the ambient air around the irradiation device on the basis of the measured temperature value and the measured humidity value.

4. The irradiation device according to claim 3, wherein controller is configured to set the relative speed to a lower speed the greater the estimated amount of moisture.

5. The irradiation device according to claim 4, wherein the controller is configured to set the relative speed in accordance with a type of the thermally distensible sheet as well as the estimated amount of moisture so that different relative speeds are set for different types of the thermally distensible sheet.

6. The irradiation device according to claim 5, wherein the controller is configured to set the relative speed on the basis of whether or not a protection film is applied to a front surface of the thermally distensible sheet in addition to the type of the thermally distensible sheet and the estimated amount of moisture.

7. The irradiation device according to claim 3, wherein the temperature sensor and the humidity sensor are provided at a position a prescribed distance away from the irradiation unit, so as to measure temperature and humidity around the irradiation device.

8. A shape forming system, comprising:
the irradiation device according to claim 1; and
a printer that prints a conversion layer on the thermally distensible sheet before the irradiation unit irradiates the thermally distensible sheet with the electromagnetic waves, the conversion layer converting the electromagnetic waves into heat when the thermally distensible sheet having the conversion layer formed thereon is irradiated with the electromagnetic waves by the irradiation unit.

9. An irradiation device for causing distension of a thermally distensible sheet that distends due to heat, comprising:
a temperature sensor;
a humidity sensor;
an irradiation unit that irradiates the thermally distensible sheet with electromagnetic waves; and
a controller configured to:
calculate, on the basis of values of measurements from the temperature sensor and the humidity sensor, a water vapor density in an ambient air that influences the thermally distensible sheet when the thermally distensible sheet distends upon being irradiated with the electromagnetic waves by the irradiation unit,
set a relative speed between the irradiation unit and the thermally distensible sheet in accordance with the calculated water vapor density in the ambient air, and
cause the irradiation unit or the thermally distensible sheet to move relative to each other at the relative speed that has been set while irradiating the thermally distensible sheet with the electromagnetic waves.

10. The irradiation device according to claim 9, wherein the controller is configured to cause the irradiation unit to move over the thermally distensible sheet, which is fixed.

11. The irradiation device according to claim 9, wherein the controller is configured to cause the thermally distensible sheet to be conveyed by a plurality of conveyance rollers while causing the irradiation unit, which has a fixed position, to radiate the electromagnetic waves.

12. The irradiation device according to claim 9,
wherein the thermally distensible sheet comprises a base member and a thermally distensible layer formed on the base member, and
wherein the controller is configured to set the relative speed more sensitively with respect to changes in the calculated water vapor density when the irradiation unit radiates the electromagnetic waves onto the thermally distensible sheet from a side of the base member than when the irradiation unit radiates the electromagnetic waves onto the thermally distensible sheet from a side of the thermally distensible layer.

13. The irradiation device according to claim 9, wherein the controller is configured to set the relative speed in accordance with a density of a conversion layer that converts electromagnetic waves into heat, the conversion layer being printed on the thermally distensible sheet as well as the calculated water vapor density in the ambient air.

14. An irradiation method for causing distension of a thermally distensible sheet that distends due to heat, comprising:
estimating an amount of moisture contained in the thermally distensible sheet on the basis of a measured temperature and a measured humidity of an ambient air;
setting a relative speed between an irradiation unit and the thermally distensible sheet in accordance with the amount of moisture estimated in the estimation step; and
causing the thermally distensible sheet and the irradiation unit to move relative to one another at the relative speed set in the setting step while causing the irradiation unit to radiate electromagnetic waves toward the thermally distensible sheet.

15. The method according to claim 14,
wherein the thermally distensible sheet comprises a base member and a thermally distensible layer formed on the base member, and
wherein in the setting step, the relative speed is set according to whether the irradiation unit radiates the electromagnetic waves to a side of the thermally distensible layer of the thermally distensible sheet, or to a side of the base member of the thermally distensible sheet.

16. The method according to claim 15, further comprising forming a color ink layer on a front surface of the thermally distensible layer,
wherein in the step of setting the relative speed, the relative speed for the thermally distensible sheet having the color ink layer formed thereon is set to a speed that is different from a speed that would be set if the thermally distensible sheet did not have the color ink layer thereon and if the electrode magnetic waves were radiated toward the front surface of the thermally distensible layer, and wherein the step of causing the thermally distensible sheet and the irradiation unit to move relative to one another includes causing the irradiation unit to radiate the electromagnetic waves toward the side of the base member of the thermally distensible sheet having the color ink layer formed thereon.

17. A non-transitory computer-readable storage medium having stored thereon a program executable by one or more processors in an irradiation device, the irradiation device further including an irradiation unit that irradiates the thermally distensible sheet with electromagnetic waves, the program causing the one or more processors to perform the following:

estimating an amount of moisture contained in the thermally distensible sheet on the basis of a measured temperature and a measured humidity in an ambient air;

setting a relative speed between the irradiation unit and the thermally distensible sheet in accordance with the amount of moisture estimated in the estimation step; and causing the thermally distensible sheet and the irradiation unit to move relative to one another at the relative speed set in the setting step while causing the irradiation unit to radiate the electromagnetic waves toward the thermally distensible sheet.

* * * * *